June 26, 1956
R. A. BAUDRY ET AL
2,752,515
BOOSTER-FAN ROTOR-VENTILATION
Filed Sept. 28, 1951
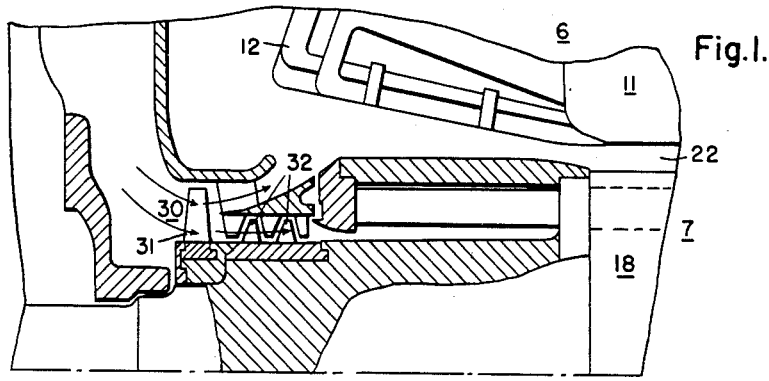
Fig.1.
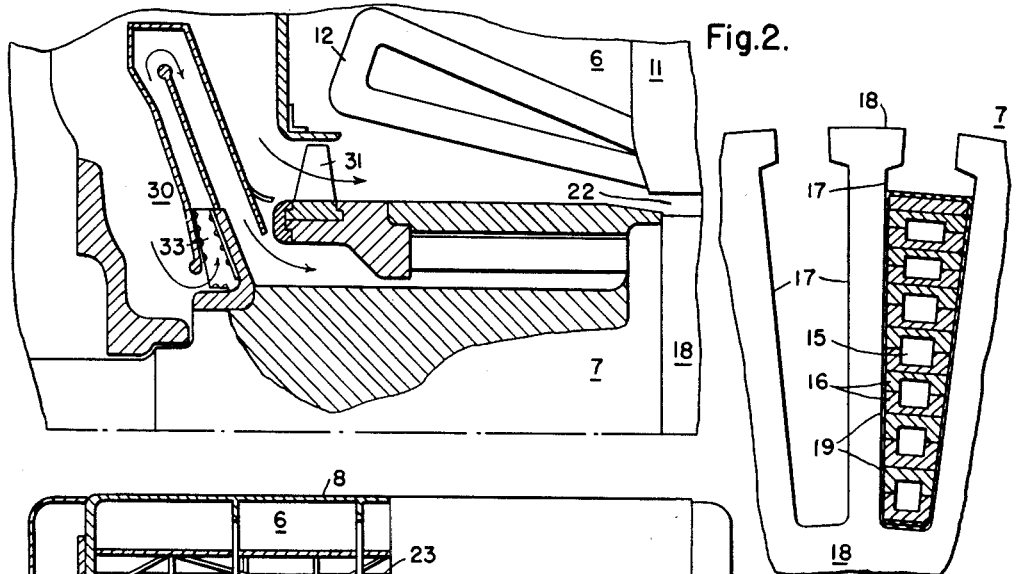
Fig.2.
Fig.4.
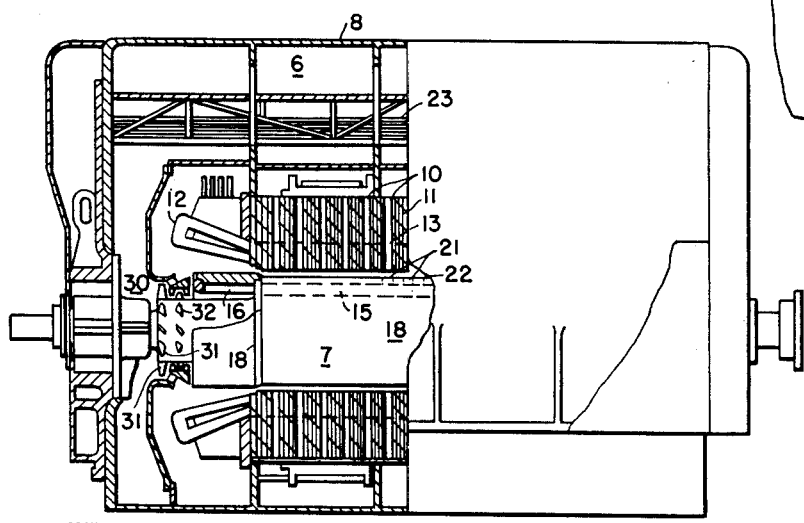
Fig.3.
WITNESSES:
E. A. M'Closkey
Wm. C. Groome
INVENTORS
René A. Baudry
and Paul R. Heller.
BY
O. B. Buchanan
ATTORNEY United States Patent Office 2,752,515
Patented June 26, 1956

2,752,515

BOOSTER-FAN ROTOR-VENTILATION

René A. Baudry, Pittsburgh, and Paul R. Heller, Irwin, Pa., assignors to Westinghouse Electric Corporation, East Pittsburgh, Pa., a corporation of Pennsylvania Application September 28, 1951, Serial No. 248,851

1 Claim. (Cl. 310—55)

Our invention relates to the ventilation of dynamo-electric machines, and it has particular relation to the use of booster-fans, or equivalent devices, for augmenting the ventilation of the rotor members of turbine-generators. While our invention is not limited thereto, it was particularly designed for an unbalanced turbine-generator design, which favors the stator member by using more and deeper stator-slots, a larger-than-usual air gap (to match the higher ampere-turns), and a larger-than-usual outer diameter of stator core; while at the same time applying, in the rotor, larger-than-usual duct-velocities to an inner-cooled rotor-construction in which conductor-cooling ducts are provided in good thermal relation with the portions of the rotor-winding which are disposed in the rotor-slots, inside of the major-insulation sheathing or slot-lining which affords the conductor-to-ground insulation in the conductor-receiving slots of the rotor-core.

Our invention is particularly applicable to hydrogen-cooled machines in which the hydrogen-pressure is maintained at a value of at least 15 pounds per square inch above the atmospheric pressure. We have found that, unless an inner-cooled construction is used, in which the cooling-ducts are in good thermal relation to the conductors which lie in the slots of the core, an increase in the gauge-pressure of the hydrogen has only a limited advantage, even when accompanied with higher-than-usual duct-velocities. We have also found that, even when an inner-cooled rotor-construction is used, limited advantages are obtained, either by increasing the gauge-pressure alone, or by increasing the average duct-velocity alone. When both of these quantities, gauge-pressure and duct-velocity, are increased simultaneously, however, quite significant increases may be obtained in the permissible rating of the winding.

With the foregoing and other general objects and principles in view, our invention consists in the structures, combinations, parts, and methods of design and use, as hereinafter described and claimed, and illustrated in the accompanying drawing, wherein Figures 1 and 2 are vertical sectional views showing details of two alternative forms of embodiment of our booster-fan construction, Fig. 3 is a vertical sectional view of one end of a dynamo-electric machine, embodying the fan-structure shown in Fig. 1, and Fig. 4 is a cross-sectional view through one of the rotor-slots.

The dynamo-electric machine which we have chosen for illustration in the drawing is a two-pole polyphase turbine-generator, having a stator member 6 and a rotor member 7, enclosed within a gas-filled housing 8, which is preferably filled with hydrogen at considerably more than 15 pounds per inch gauge-pressure. Both the stator and rotor members are provided with cooling-passageways. In the stator member 6, the cooling-passageways are illustrated in the form of radially extending passageways or ventilating-spaces 10 which are provided between bundles of laminations of the cylindrical stator core 11. A polyphase stator winding 12 is carried by axially extending slots 13 in the stator core.

In the case of the rotor-member, the cooling-passageways include axially extending ducts 15 which preferably lie alongside of the rotor-conductors 16 which lie within the axially extending conductor-receiving slots 17 of the cylindrical rotor core 18. As disclosed, for example, in the Baudry Patent 2,221,567, granted November 12, 1940, the rotor-winding 16 has a major slot-insulation 19 (Fig. 4) which surrounds both the rotor-conductors 16 and their associated conductor-cooling ducts 15, in the several slots 17 of the rotor-core 18. In the usual construction, near the midpoint in the length of the machine, the rotor-member 7 is provided with radial ducts 21 (Fig. 3), in communication with the conductor-cooling ducts 15, venting into the air gap 22 between the stator and rotor members.

Hydrogen-cooled machines have to be provided with fan-means for maintaining a recirculation of the hydrogen through the cooling-passageways of the stator and rotor members. It is necessary, also, to provide one or more coolers in the recirculating path, and in the illustrated form of our invention, this is done by means of an axially extending cooler 23, disposed between the outer periphery of the stator-core 11 and the housing 8. An exemplary arrangement using such a cooler is described in the copending Baudry application Serial No. 109,999, filed August 12, 1949, and its substitute-application Serial No. 248,853, filed September 28, 1951. To maintain the recirculation of the hydrogen, some sort of fan-means is needed. In the case of the rotor, the rotor-member itself acts as a centrifugal fan for creating a certain fan pressure-head which produces a certain average duct-velocity in the conductor-cooling ducts 15 of the rotor. To maintain an adequate hydrogen circulation in the stator member 6, it is always necessary to provide some sort of fan-means, usually in the form of a fan which is carried by the rotor member at each end thereof.

In accordance with our invention, we provide extra means for creating a fan-pressure which is effective in blowing hydrogen into the rotor member 7, for augmenting the centrifugal fanning action of the passageways in the rotor-core itself. This augmenting fan-pressure which is effective in the rotor-member is preferably higher than the fan-pressure which is used for ventilating the stator-core 11. An extra-high fan-pressure would produce only limited benefits in the stator-member 6, because the rating of the stator-winding 12 is limited by the necessity of withdrawing the $I^2R$ losses of the stator-conductors through the winding-insulation, which constitutes a rather formidable heat-barrier, because of the voltage-rating of the stator or armature winding 12. In the case of the rotor-member 7, however, because of the inner-cooled construction, in which the hydrogen is brought into substantially direct contact with the rotor-conductors 16, an increase in the fan-pressure, and hence an increase in the rotor duct-velocities, results in a rapid increase in the rating of the rotor-winding 16.

Our present invention is characterized by the use of a special fan-means 30, preferably at each end of the rotor member 7. This fan-means 30 has one means, such as blades 31, which create a fan-pressure which is effective in maintaining the recirculation of the hydrogen at least through the stator cooling-passageways 10. These blades 31, or a portion thereof, may, or may not, also create a fan-pressure which is effective in blowing hydrogen into the axial ducts 15 of the rotor-member 7. Each fan 30, in accordance with our present invention, is also provided with additional means, such as the blades 32, which are so disposed as to create a fan-pressure which is selectively effective in maintaining or augmenting the hydrogen-circulation in the axially extending rotor-ducts 15.

Preferably, the fan-pressure which is developed by the fan-means 30 for maintaining or augmenting the hydrogen-circulation through the rotor cooling-passageways 15 and 21 is greater than the fan-pressure which is developed by said fan-means 30 for maintaining the hydrogen-circulation through the stator cooling-passageways 10. In this way, we effect material economies in the cost of maintaining the necessary fanning-action, for cooling the stator and rotor members respectively.

It will be understood that the stator winding 12 is a polyphase armature-winding of relatively high voltage, while the rotor-winding 16 is a field-winding of relatively low voltage. In order to avoid the cost and the possible insulation-difficulties (in very high-voltage machines) of inner-cooling the stator-conductors by bringing the hydrogen into direct contact therewith, inside of the major insulation which has to be provided for the stator windings, we have illustrated our present invention as being embodied in a special design of machine-proportions which will favor the stator member, by using deeper stator slots, a larger-than-usual air gap 22, and a larger-than-usual outer diameter of the stator-core 11, although our invention is not limited to such a design. In this way, we provide a stator-member which can have a higher load-rating than would be usual for a machine having the rotor-diameter which we use. Thus, our air-gap 22 might be described as being characterized as being more than two inches, which is more than the usual construction, although larger air gaps have been known in machines having special characteristics, but not the special cooling-characteristics which characterize our present invention.

Our rotor-member is then worked harder, by being given more-than-usual cooling, so that our rotor-rating is higher than usual, in comparison with its diameter and length. Our rotor-diameter is also smaller than usual, as compared to the stator-dimensions.

It will be understood, of course, that we may use any suitable form of shaft-mounted fan-means 30, for creating the two different fan-pressures which are effective in the stator and rotor respectively. We have called this means a booster-blower type of fan-means. It may be an axial-type fan, which moves or impels the gas in an axial direction, as indicated in Fig. 1; or a centrifugal type of blower may be used, for creating the higher fan-pressures which are to be effective in the rotor, as indicated at 33 in Fig. 2.

It will be understood, of course, that the recirculation-means also includes the necessary baffles and guiding-means for directing the flow of hydrogen so that it traverses the cooler 23, and properly enters and leaves the various ventilating-passageways and fan-means which we have provided.

While we have illustrated our invention in only two alternative forms of embodiment, we wish it to be understood that we are not limited to the illustrated details. We desire, therefore, that the appended claim shall be accorded the broadest construction consistent with its language.

We claim as our invention:

A dynamo-electric machine having stator and rotor members, both having cylindrical cores, both cores having axially extending slots and having windings carried by said slots, the stator-winding being a polyphase armature-winding, and the rotor-winding being a field-winding of a lower voltage than the armature-winding; both said stator member and said rotor member having cooling-passageways therein, the cooling-passageways of at least the rotor member including axially extending ducts and also, near the midpoint in the length of the machine, radial ducts venting said axial ducts to the air-gap of the machine, the air-gap being more than two inches, and the axially extending rotor-ducts including conductor-cooling ducts in good thermal relation with at least the portions of the rotor-winding which are disposed in the rotor-slots, at least the slot-lying portions of the rotor-winding having major slot-insulation which surrounds the rotor-conductors and their associated conductor-cooling ducts; a housing enclosing the entire machine; a filling of hydrogen at more than 15 pounds per square inch gauge-pressure in said housing; a heat-exchanger disposed within said housing; and fan-means carried by the rotor member, at at least one end of the rotor core, for maintaining a recirculation of the gas through the cooling-passageways of the stator and rotor members; characterized by said fan-means having means for creating a fan-pressure which is effective in the stator cooling-passageways, and having additional means for creating a larger fan-pressure which is effective in the axially extending rotor-ducts.

References Cited in the file of this patent

UNITED STATES PATENTS

| | | |
|---|---|---|
| 1,546,234 | Hannah | July 14, 1925 |
| 2,221,567 | Baudry | Nov. 12, 1940 |
| 2,451,219 | Holmgren | Oct. 12, 1948 |
| 2,605,312 | Boyer | July 29, 1952 |

FOREIGN PATENTS

| | | |
|---|---|---|
| 380,067 | Great Britain | Sept. 7, 1932 |
| 383,371 | Great Britain | Nov. 17, 1932 |

OTHER REFERENCES

A. I. E. E. Transactions for 1950, pages 191–194, published by the American Inst. of Elec. Engs., 33 West St., New York city.